United States Patent [19]

Focht

[11] 4,397,815
[45] Aug. 9, 1983

[54] APPARATUS FOR THE DRY CROSSLINKING OF STRANDS OF ELASTOMERS

[75] Inventor: Harry Focht, Hemmingen, Fed. Rep. of Germany

[73] Assignee: Paul Troester Maschinenfabrik, Hanover, Fed. Rep. of Germany

[21] Appl. No.: 297,410

[22] Filed: Aug. 28, 1981

[30] Foreign Application Priority Data

Sep. 2, 1980 [DE] Fed. Rep. of Germany ....... 3033012

[51] Int. Cl.³ ............................................. B01J 19/12
[52] U.S. Cl. ..................................... 422/128; 156/55; 156/433; 174/102 C; 422/186; 425/174.6
[58] Field of Search ................. 422/128, 186, 186.01; 174/68 A, 102 R, 102 C, 106 R, 110 FC; 156/55, 433, 441; 425/94, 104, 174.6, 506; 455/91, 120; 250/530, 531, 528

[56] References Cited

U.S. PATENT DOCUMENTS

| | | | |
|---|---|---|---|
| 2,119,853 | 6/1938 | Curtis | 156/55 X |
| 2,211,584 | 8/1940 | Ruben | 174/102 C |
| 2,453,313 | 11/1948 | Gordon | 156/55 |
| 2,791,624 | 5/1957 | Kigler | 156/55 X |
| 3,340,112 | 9/1967 | Davis et al. | 156/55 X |
| 3,575,748 | 4/1971 | Polizzano | 156/55 X |
| 3,819,434 | 6/1974 | Dembiak et al. | 156/55 X |
| 4,025,277 | 5/1977 | Monroe | 425/174.6 X |
| 4,080,131 | 3/1978 | Bahder et al. | 425/174.6 X |
| 4,157,452 | 6/1979 | Pignataro et al. | 156/55 X |

FOREIGN PATENT DOCUMENTS 2851103 6/1980 Fed. Rep. of Germany .

*Primary Examiner*—Richard L. Chiesa
*Attorney, Agent, or Firm*—Robert E. Burns; Emmanuel J. Lobato; Bruce L. Adams

[57] ABSTRACT

Apparatus for the dry cross linking of strands of elastomer, in particular in the production of elastic cables and multilayered profiles comprises a string of tubes through which the strand passes. Between adjacent tube sections, there are hollow bodies having central cavities in line with the bore of the tubes and a plurality of branch cavities radiating from the central cavity. One of the branch cavities is connected through a UHF transformer and a wave guide with the UHF generator while tuning probes are arranged in other branch cavities. The UHF transformer has an inwardly diverging tapered opening in which a tapered plug of ceramic or plastic is fitted to provide a pressure seal. The interior of the tube sections and the hollow bodies is supplied with inert gas under pressure.

16 Claims, 4 Drawing Figures

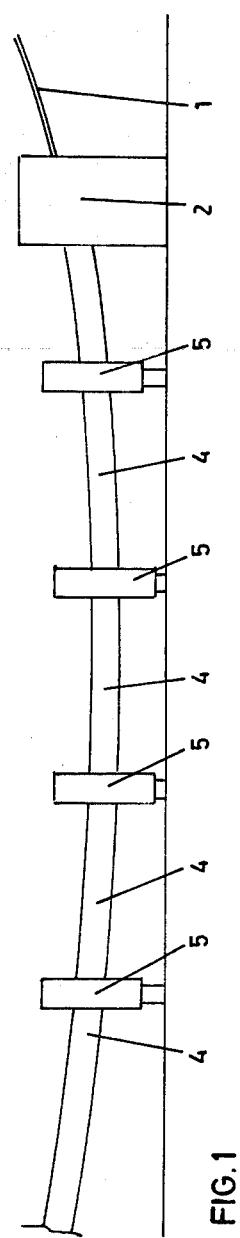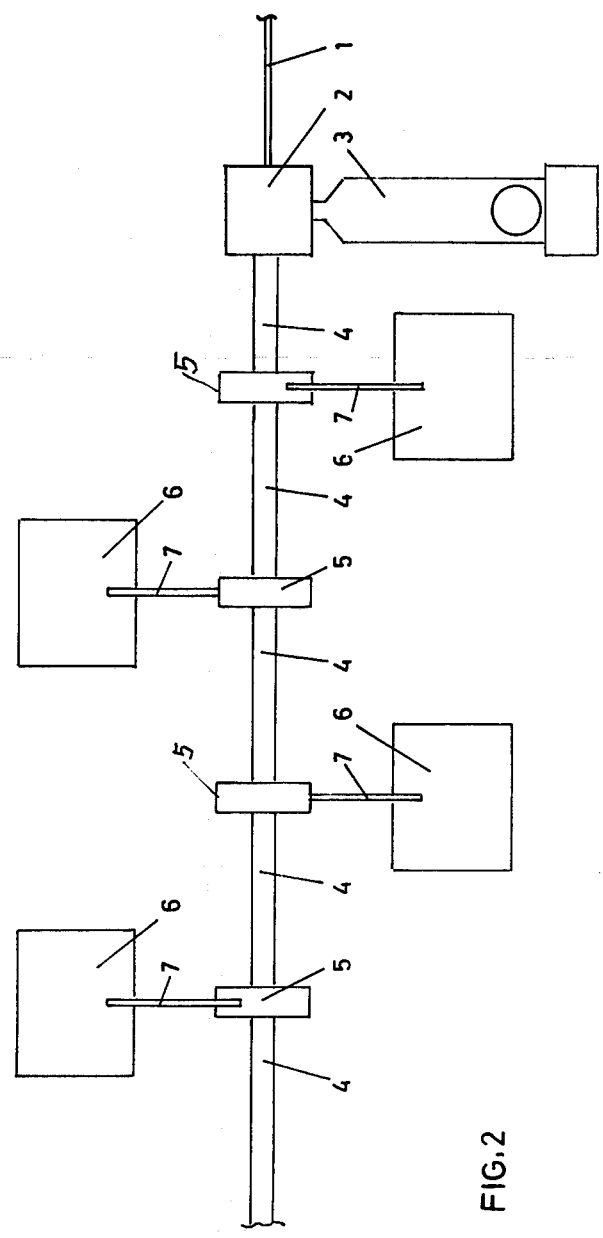

APPARATUS FOR THE DRY CROSSLINKING OF STRANDS OF ELASTOMERS

FIELD OF THE INVENTION

The present invention relates to an apparatus for the dry crosslinking of strands of elastomers, in particular in the production of electric cables as well as in the production of multilayer profiles which also can be electrically conductive, comprising a tube through which the strand is passed and which is filled with an inert gas under pressure and means for applying UHF electromagnetic energy to the strand while passing through the tube.

BACKGROUND OF THE INVENTION

Apparatus of this kind is disclosed in DE-OS No. 28 51 103.

With the considerable amount of electromagnetic UHF energy which is required for the crosslinking of an elastomer, the transmission of this UHF energy into the tube through which the strand of elastomer is passed presents problems. This is because considerable amount of UHF energy in millimeter, centimeter or decimeter wave length must be introduced substantially without loss into the tube which is filled under pressure with inert gas which is necessary to prevent chemical reaction on the outer face of the strand during crosslinking, but which must not be permitted to get into the electromagnetic generator for the UHF. The introduction of UHF energy into the tube without loss is required not only on the ground of saving energy but more particularly because in those places where the loss occurs there would be considerable heating with the possibility of damaging or destroying parts of the apparatus.

SUMMARY OF THE INVENTION

The present invention is directed to the problem of transmitting UHF energy to a tube filled with inert gas under pressure substantially without loss.

In accordance with the invention the UHF energy is introduced through a hollow body which is connected between two sections of the tube through which the strand of elastomer is passed and which has a cavity of greater cross sectional dimensions than the tube. UHF energy from a UHF generator is transmitted to the cavity of the hollow body through a wave guide provided with a UHF transformer or at least an E- or H-angle or curve or through a coaxial conductor provided with a UHF transformer. Inside the transformer or the E- or H-angle or curve there is provided a gas pressure seal permitting the passage of the UHF energy.

With this apparatus, UHF energy is introduced substantially without loss into the tube through which the cable or other strand of elastomer passes in an atmosphere of inert gas under pressure. The arrangement of the pressure seal in that place where a transformer is arranged in the coaxial or hollow conductor provides assurance that a satifactory seal for the gas pressure is obtained with little or no electrical loss. In this manner the electromagnetic UHF energy can be delivered to the tube through a coaxial conductor or wave guide which assures a virtually loss-free introduction of the UHF energy into the tube. As the cavity in the hollow body between the tube sections has larger cross sectional dimensions than the tube, it is possible to introduce tuning elements which serve to avoid reflection of the UHF energy in the energy supply line from the UHF generator and to assure coupling of the UHF energy in both of the adjacent tube sections. This cavity of greater cross section than the tube can also serve partially as a resonator chamber.

Advantageously the tuning elements are accommodated in a short hollow conductor or wave guide coupled with the cavity in the hollow body between adjacent tube sections. Suitably such short hollow conductor or wave guide lies in the same plane as the wave guide for transmitting UHF energy from the UHF generator to the hollow body between adjacent tube sections. The tuning elements can, for example, be in the form of antennae, pins, probes or shorting plungers. If the tuning elements are tuning pins, these can suitably project into the cavity in the hollow body. Advantageously, the tuning elements are used for field shifting inside the hollow body and inside the tubes. Tuning elements can also be provided in the energy conductors from the UHF generator in order to provide field shifting with respect to the generator.

It is highly advantageous in the operation of apparatus in accordance with the invention when the energy supply coaxial or hollow conductor and the hollow conductor housing the tuning elements are displaced about 120° from one another in the hollow body between tube sections.

Suitably the ends of the tubular sections are provided with flanges for connection of the tubular sections to opposite sides of the hollow body. This provides a simple means of connection.

In order to achieve uniform crosslinking of the elastomer strand in the tube on all sides, it is advantageous when each of the transmission lines of the hollow bodies has a radial position with respect to the tube axis which is displaced angularly from the transmission line feeding the neighboring hollow body.

It has been found especially advantageous when the UHF transformer is secured directly to the hollow body. It is thereby best able to resist the high mechanical forces imposed by the inert gas pressure in the tube.

It is advantageous when the UHF transformer is formed by a continual cross section transistion or at least a cross section change in the wave guide. Within this cross section change the pressure seal desirably comprises a block of ceramic or plastic. This permits passage of the UHF energy while maintaining gas pressure in the tube.

The block may be rectangular whereby the faces of the cross section change are parallel to one another and parallel to the side faces of the block whereby the block is securely held between these faces of the cross section change of the wave guide. The block thus has cross section dimensions which are larger than the cross section of the wave guide. Advantageously the block is secured in place by cement or sealing material.

However, the block can be wedge-shaped, frustoconical or pyramid-shaped with its cross section increasing in a direction toward the tube axis. It is thereby held in place in the wave guide by the gas pressure in the tube. Likewise the block can be in the form of a hollow cone or hollow pyramid or hollow wedge-shaped which is pressed inwardly and thus against the sealing faces of the UHF transformer. The plug can be provided with a special sealing material which can be of elastomeric or metallic nature. Thus for example copper or lead sheet can serve as the seal as can also foil or a profile produced from plastic.

The block itself advantageously is formed of ceramic or of plastic, for example PTFE (Teflon).

It is advantageous to arrange the supply line for supplying inert gas under pressure directly over the block of ceramic or plastic material which provides the pressure seal. The gas stream entering in this location and then flowing into the adjacent tubes carries with it any impurities produced in the crosslinking so that such impurities are not in position to be heated by the UHF energy thereby damaging the pressure seal.

BRIEF DESCRIPTION OF DRAWINGS

The nature and advantages of the invention will be more fully understood from the following description of a preferred embodiment shown by way of example in the accompanying drawings in which:

FIG. 1 is a schematic side view of the apparatus;
FIG. 2 is a schematic plan view of the apparatus.

DESCRIPTION OF PREFERRED EMBODIMENT

Figure 3:
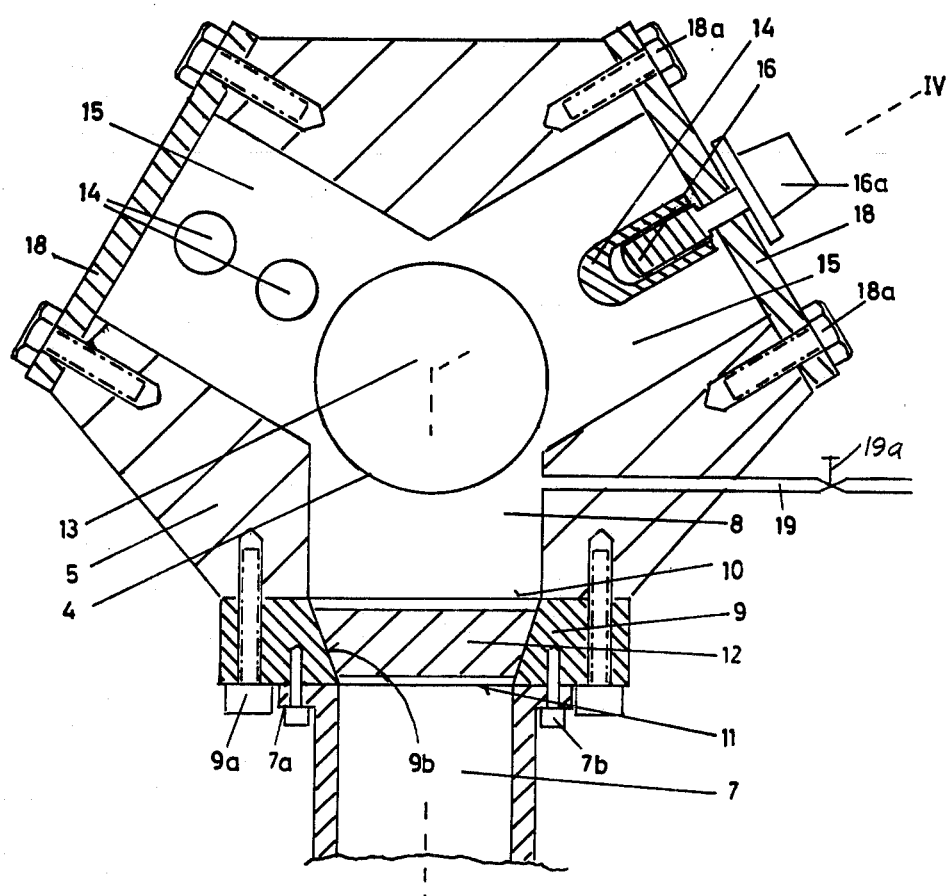
FIG. 3 is a cross section through one of the hollow bodies between adjacent tube sections.

A cable core 1 from unreeling apparatus or a production machine (not shown) is led to the extrusion head 2 of an extruder 3 where it is covered with elastomer material. Attached to the extrusion head 2 is a tube 4 through which the core 1 covered with elastomer material passes and in which crosslinking of the elastomer material is to be carried out. The tube 4 comprises a plurality of tube sections between which hollow bodies 5 are inserted. UHF energy from UHF generators 6 is led to the hollow bodies 5 by transmission lines 7. These can, for example, be coaxial conductors but are shown as hollow conductors or wave guides. In the embodiment illustrated by way of example in the drawings there are four hollow bodies 5. These are so arranged that the UHF energy transmission lines 7 are displaced relative to one another so as to enter the hollow bodies from different directions. As seen in FIG. 2, two of the UHF generators 6 are disposed on one side of the tube 4 while the other two are disposed on the opposite side. The transmission lines are so arranged that one enters the respective hollow body 5 in the upper left quarter, the next in the lower right quarter, the third in the lower left quarter and finally the fourth in the upper right quarter.

Each of the bodies 5 consist of a metal block in which there is formed a channel 8 which serves to lead in the UHF energy and is connected through the UHF transformer 9 to the wave guide 7 which serves to transmit UHF energy from the generator 6. In the illustrated embodiment, the UHF transformer 9 is secured to the body 5 by a plurality of screws 9a. However, it can be formed directly as part of the body 5. The UHF transformer 9 has a central passage 9b, the cross section of which decreases between the inner face 10 and outer face 11. In this tapered passage 9b there is a gas pressure seal 12. In the illustrated embodiment the pressure seal 12 comprises a truncated pyramid form block 12 formed of ceramic material or of plastic material such as Teflon the walls of which fit exactly the walls of the passage 9b of the transformer 9. By the gas pressure inside the tube 4 which also prevails inside the hollow bodies 5, the pressure seal 12 is pressed tightly into the tapered passage 9b of the transformer 9. There is thus provided an effective seal. If desired, sealing material, for example of metal or plastic, can be provided between the block 12 and the transformer 9. The wave guide 7 is provided at its end with a flange 7a and is secured to the UHF transformer 9 by screws 7b passing through holes in the flange.

In the body 5 there is a central cavity 13 which is aligned with the interior of the tubes 4 and has a somewhat greater inner cross section than the tube. Branching off radially from the central cavity 13 are the channel 8 to which the wave guide 7 is coupled by the UHF transformer 9 and two branch cavities 15 which constitute short hollow conductor or wave guide sections. In the illustrated embodiment, the channel 8 and the wave guide sections 15 are disposed at an angle of about 120° to one another about the axis of the tube 4. In one or both of the wave guide sections 15 there are tuning elements shown in the form of adjustable plungers 14 which are movable inwardly and outwardly by threaded spindles 16 that are rotatable automatically or manually by means of knobs 16a. For automatic adjustment there are provided special probes in the cavity 13 or in the adjacent tube sections 4 which control actuation of the spindle 16 by a servo motor. The adjustable tuning plungers 14 can be arranged parallel to the axis of the tubes 4 as shown at the left side of FIG. 3 or can be arranged radially as shown at the right side of FIG. 3. Shorting plugs adjustable by means of the spindles 16 in the branch cavities 15 can also be used as tuning elements. The branch cavities 15 are closed by plates 18 secured to the body 5 by screws 18a.

Figure 4:
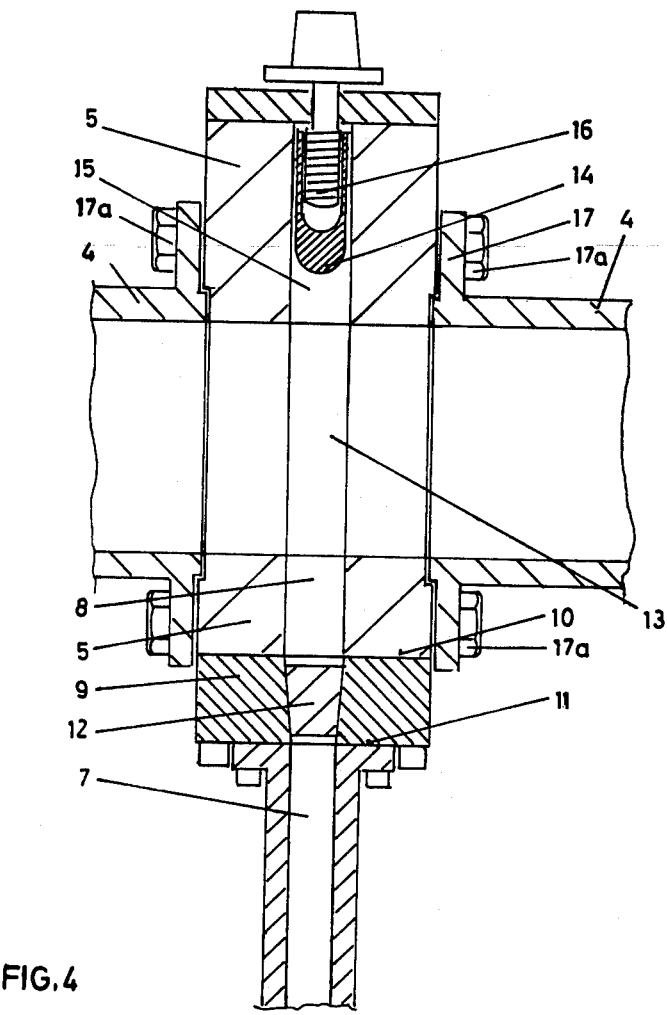
FIG. 4 is a longitudinal section taken on the line IV—IV in FIG. 3.

As seen in FIG. 4, the tube sections 4 are provided at their ends with flanges 17 which are secured to the body 5 by means of screws 17a. Suitable sealing means, for example gaskets or O-rings, are provided between the flanges 17 and the body 5 to assure a gas-tight seal. Moreover, at the exit end of the tube 4 there is provided a seal through which the cable or other profile—which by now is crosslinked—passes. The inlet end of the tube 5 is closed by the extruder head 2. The tube 4 together with the hollow bodies 5 thus constitutes a gas-tight enclosure for maintaining pressure in the tube. Inert gas under pressure is supplied to the tube 4 preferably through inlets 19 which are provided with valves 19a and open into the hollow bodies 5 just inwardly of the UHF transformers 9. From there the inert gas flows into the adjacent tube sections. In this manner any impurities are carried away from the zone in which the UHF energy is applied. In this manner there is avoided heating of the impurities by the UHF energy which might lead to damage to the UHF transformers 9 and seals 12.

While a preferred embodiment of the invention is illustrated by way of example in the drawings it will be understood that variations and modifications are possible and hence that the invention is not limited to the illustrated embodiments.

What is claimed is:

1. Apparatus for the dry cross linking of a strand of elastomeric material, in particular in electric cable production as well as the production of multilayered profiles, comprising a plurality of aligned tubular sections with a hollow body between adjacent sections through which said strand is passed, said hollow body having a cavity of larger cross sectional dimensions than said tubular sections, UHF generating means connected by a UHF transmission line with said cavity to apply UHF energy to said strand as it passes through said hollow body, UHF coupling means between said transmission line and said cavity, fluid pressure sealing means associated with said UHF coupling means, tuning means in said cavity and means for supplying inert gas under pressure to the interior of said tubular sections and said hollow body.

2. Apparatus according to claim 1, in which said tuning means is in a hollow conductor section coupled with said cavity of said hollow body.

3. Apparatus according to claim 2, in which said transmission line connecting said UHF generating means with said cavity and said hollow conductor section in which said tuning means is disposed are in a common plane.

4. Apparatus according to claim 1, in which said tuning means comprises at least one tuning plug projecting into said cavity of said hollow body.

5. Apparatus according to claim 1, in which said tuning means comprises at least one shorting plunger.

6. Apparatus according to claim 2, in which the transmission line connecting said UHF generating means with said cavity and said hollow conductor section in which said tuning means is disposed are arranged at an angle of about 120° to one another about the axis of said tubular sections.

7. Apparatus according to claim 1, in which said tuning means comprises tuning elements arranged to shift the field in said hollow body and said tubular sections.

8. Apparatus according to claim 1, in which said tubular sections have at their ends flanges for connection of said tubular section to said hollow body.

9. Apparatus according to claim 1, in which there are at least three of said tubular sections and a plurality of hollow bodies between said tubular sections each with a transmission line for transmitting UHF energy thereto, and in which the transmission lines of adjacent hollow bodies extend at different angles from the axis of said tubular sections.

10. Apparatus according to claim 1, in which said coupling means comprises a UHF transformer having a tapered opening which enlarges inwardly toward said cavity and in which said fluid pressure sealing means comprises a tapered plug of electrical insulating material fitting into said tapered opening.

11. Apparatus according to claim 10, in which said tapered plug is of ceramic material.

12. Apparatus according to claim 10, in which said tapered plug is of plastic material.

13. Apparatus according to claim 10, in which said means for supplying inert gas under pressure comprises an inlet in said hollow body just inwardly of said fluid pressure sealing means.

14. Apparatus according to claim 1, in which said transmission line is a wave guide and in which tuning means is arranged in said wave guide.

15. Apparatus according to claim 1, in which said hollow body has a central cavity aligned with adjacent tubular sections and at least two branch cavities radiating from said central cavity and in which said transmission line is connected with one of said branch cavities and said tuning means is in another of said branch cavities.

16. Apparatus according to claim 15, in which there are three of said branch cavities disposed at an angle of about 120° to one another, tuning means being disposed in two of said branch cavities.

* * * * *